United States Patent
Payne et al.

(10) Patent No.: US 8,401,760 B2
(45) Date of Patent: Mar. 19, 2013

(54) GAS TURBINE ENGINE OIL CONSUMPTION MONITORING SYSTEM AND METHOD

(75) Inventors: David A. Payne, Phoenix, AZ (US); Harold Riley, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 913 days.

(21) Appl. No.: 12/498,957

(22) Filed: Jul. 7, 2009

(65) Prior Publication Data

US 2011/0010069 A1 Jan. 13, 2011

(51) Int. Cl.
*G06F 19/00* (2011.01)
*G06G 7/70* (2006.01)

(52) U.S. Cl. ...... 701/100; 701/113; 701/29.5; 701/30.5; 701/30.8; 701/30.9; 701/33.4; 701/34.2; 701/34.4; 701/1; 702/50; 702/51; 702/52; 702/53; 702/54; 702/55; 73/112.01; 73/112.02; 73/112.03; 73/112.04; 73/112.05; 73/112.06

(58) Field of Classification Search .............. 702/55; 73/304 C

See application file for complete search history.

(56) References Cited

U.S. PATENT DOCUMENTS

| | | | | |
|---|---|---|---|---|
| 2,500,348 | A * | 3/1950 | De Giers et al. | 73/313 |
| 3,016,701 | A * | 1/1962 | Kolfenbach et al. | 60/39.08 |
| 3,580,074 | A * | 5/1971 | Wescott et al. | 73/304 C |
| 3,722,212 | A * | 3/1973 | Stein | 60/39.08 |
| 3,830,090 | A * | 8/1974 | Hersch et al. | 73/304 C |
| 4,420,976 | A * | 12/1983 | Orloff et al. | 73/304 C |
| 4,576,001 | A * | 3/1986 | Smith | 60/39.08 |
| 4,640,127 | A * | 2/1987 | Schneider | 73/295 |
| 4,672,842 | A * | 6/1987 | Hasselmann | 73/49.2 |
| 4,782,698 | A * | 11/1988 | Wilson | 73/304 C |
| 4,872,120 | A * | 10/1989 | Orloff et al. | 702/52 |
| 5,033,010 | A * | 7/1991 | Lawrence et al. | 701/31.4 |
| 5,060,156 | A * | 10/1991 | Vajgart et al. | 701/29.5 |
| 5,408,412 | A * | 4/1995 | Hogg et al. | 701/33.4 |
| 5,552,987 | A * | 9/1996 | Barger et al. | 701/14 |
| 6,459,995 | B1 * | 10/2002 | Collister | 702/23 |
| 6,466,858 | B1 * | 10/2002 | Adibhatla et al. | 701/100 |
| 6,470,666 | B1 * | 10/2002 | Przytulski et al. | 60/772 |
| 6,502,460 | B1 * | 1/2003 | Lin et al. | 73/304 C |
| 6,557,396 | B2 * | 5/2003 | Ismail et al. | 73/53.05 |
| 6,758,187 | B2 * | 7/2004 | Waters | 123/198 F |
| 6,799,458 | B2 * | 10/2004 | Ismail et al. | 73/304 C |
| 7,130,738 | B2 * | 10/2006 | Ha | 701/114 |
| 7,523,006 | B2 * | 4/2009 | Muhl et al. | 702/52 |
| 7,584,619 | B2 * | 9/2009 | Granitz et al. | 60/785 |
| 7,904,229 | B2 * | 3/2011 | Walthall et al. | 701/100 |
| 7,940,060 | B2 * | 5/2011 | Halalay et al. | 324/698 |
| 8,103,462 | B2 * | 1/2012 | Liu et al. | 702/55 |
| 2004/0079150 | A1 * | 4/2004 | Breed et al. | 73/291 |
| 2008/0066543 | A1 * | 3/2008 | Sabini et al. | 73/304 C |
| 2009/0076677 | A1 * | 3/2009 | Walthall et al. | 701/30 |
| 2009/0107771 | A1 * | 4/2009 | Liu et al. | 184/7.4 |

\* cited by examiner

FOREIGN PATENT DOCUMENTS

EP 1630633 A2 3/2006

*Primary Examiner* — Khoi Tran
*Assistant Examiner* — Bhavesh V Amin
(74) *Attorney, Agent, or Firm* — Ingrassia Fisher & Lorenz, P.C.

(57) ABSTRACT

A system and method of monitoring oil consumption in a gas turbine engine system are provided. When the gas turbine engine is not running the reservoir oil level, reservoir oil temperature, and reservoir attitude are sensed. The current gas turbine engine system oil quantity is determined based on at least the sensed reservoir oil level, the sensed reservoir oil temperature, and the sensed reservoir attitude. When a predetermined event has occurred, an average gas turbine engine system oil quantity is automatically calculated. The gas turbine engine system oil consumption rate is determined from a plurality of the average oil quantities.

16 Claims, 4 Drawing Sheets

GAS TURBINE ENGINE OIL CONSUMPTION MONITORING SYSTEM AND METHOD

TECHNICAL FIELD

The present invention generally relates to aircraft gas turbine engines, and more particularly relates to a system and method for monitoring oil consumption in gas turbine engine systems.

BACKGROUND

Governmental agencies that regulate commercial air flight have established regulations regarding the monitoring of oil consumption of gas turbine engine systems, and particularly those gas turbine engine systems that are used as auxiliary power units (APUs). More specifically, commercial aircraft operators are required to have an engine oil consumption monitoring program to ensure that there is enough oil to complete each ETOPS (Extended-range, Twin-engine, Operational Performance Standard) flight. The program needs to cover not only propulsion engines, but APUs if such are required for an ETOPS flight.

Presently, gas turbine engine system oil consumption is determined manually. For example, using data from handwritten log books and maintenance records, oil consumption may be determined from the amount of oil added to the gas turbine engine system divided by estimated engine operating time. Although this is generally reliable, it is less accurate than what is desired, and is potentially time-consuming.

Hence, there is a need for a relatively high-accuracy automated system and method for monitoring and reporting gas turbine engine system oil consumption. The present invention addresses at least this need.

BRIEF SUMMARY

In one exemplary embodiment, a method of monitoring oil consumption in a gas turbine engine system includes sensing, when the gas turbine engine is not running, reservoir oil level, reservoir oil temperature, and reservoir attitude. The current gas turbine engine system oil quantity is determined based on at least the sensed reservoir oil level, the sensed reservoir oil temperature, and the sensed reservoir attitude. When a determination is made that a predetermined event has occurred, an average gas turbine engine system oil quantity is automatically calculated. Gas turbine engine system oil consumption rate is determined from a plurality of determined average oil quantities.

In another exemplary embodiment, a gas turbine engine oil consumption monitoring system includes a level sensor, a temperature sensor, an attitude sensor, and a processor. The level sensor is configured to sense oil level in a reservoir and supply a level signal representative thereof. The temperature sensor is configured to sense oil temperature in the reservoir and supply a temperature signal representative thereof. The attitude sensor is configured to sense reservoir attitude and supply an attitude signal representative thereof. The processor is coupled to receive the level signal, the temperature signal, and the attitude signal. The processor is adapted to receive a signal that indicates a gas turbine engine is not running and is configured, upon receipt thereof, to determine current gas turbine engine system oil quantity based on at least the level signal, the temperature signal, and the attitude signal. The processor is further configured to determine that a predetermined event has occurred, automatically calculate an average gas turbine engine system oil quantity after the predetermined event has occurred, and determine gas turbine engine system oil consumption rate from a plurality of determined average oil quantities.

Furthermore, other desirable features and characteristics of the present oil consumption rate determination system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
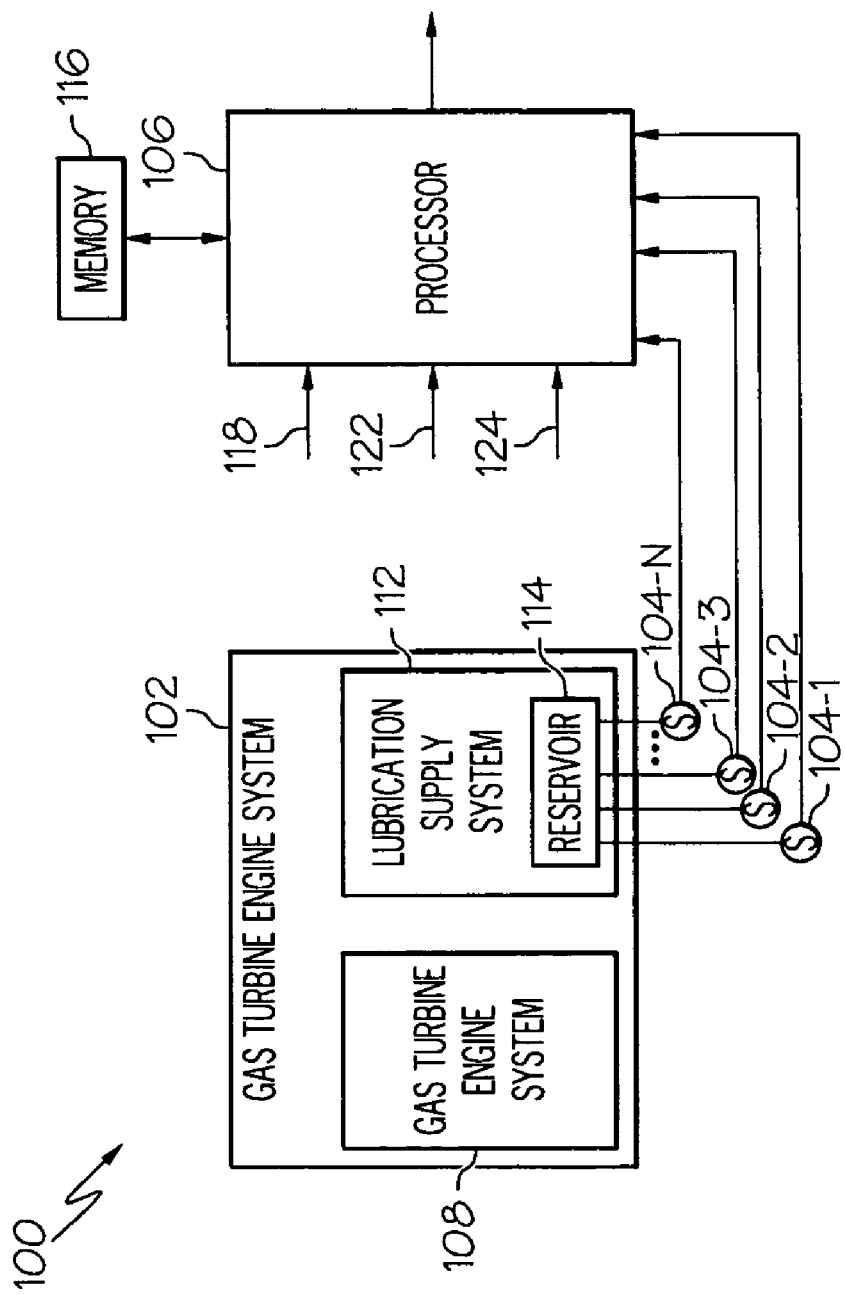
FIG. 1 depicts a functional block diagram of an exemplary embodiment of a gas turbine engine oil consumption monitoring system.

The following detailed description is merely exemplary in nature and is not intended to limit the invention or the application and uses of the invention. Furthermore, there is no intention to be bound by any theory presented in the preceding background or the following detailed description. In this regard, the invention may be implemented in any one of numerous gas turbine engine systems, including those used to provide aircraft propulsion, those used to implement auxiliary power units (APUs), or those used to generate power in any one of numerous environments, not just aircraft environments.

It is additionally noted that embodiments of the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to FIG. 1, a functional block diagram of an exemplary embodiment of a gas turbine engine oil consumption monitoring system 100 is depicted and includes a gas turbine engine system 102, a plurality of sensors 104 (e.g., 104-1, 104-2, 104-3, . . . , 104-N), and a processor 106. The gas turbine engine system 102, at least in the depicted embodiment, includes a gas turbine engine 108 and a lubrication supply subsystem 112. It will be appreciated that the gas turbine engine system 102 may, in some embodiments, include other devices and subsystems. However, a description of such devices and subsystems, if included, is not needed to fully describe and enable the present invention, and thus will not be provided. Moreover, the gas turbine engine 108 may be implemented using any one of numerous types of gas turbine engines now known or developed in the future.

The lubrication supply system 112 is used to store and supply lubricating oil to the gas turbine engine 108. It will be appreciated that the lubrication supply system 112 may also be implemented using any one of numerous systems and configurations now known or developed in the future. For example, it may include a pump that is driven by the gas turbine engine 108, or a pump that is driven by a separate drive source, such as an electric motor. Moreover, the pump may be variously implemented. In any case, the lubrication supply system 112 includes an oil reservoir 114 from which lubricating oil is drawn, and supplied to the gas turbine engine 108 for lubrication. It will be appreciated that the reservoir 114 may be the gas turbine engine sump, or it may separate oil storage device.

No matter the specific implementation and configuration of the reservoir 114, at least some of the sensors 104 are configured to sense various parameters associated with the oil in the reservoir 114 and with the reservoir itself. In particular, the sensors 104 include at least a level sensor 104-1, a temperature sensor 104-2, and an attitude sensor 104-3. The level sensor 104-1 is configured to sense the oil level in the reservoir 114 and supply a level signal representative thereof. The level sensor 104-1 may be implemented using any one of numerous level sensors now known or developed in the future. In a particular preferred embodiment, however, the level sensor 104-1 is implemented using a linear variable differential transformer (LVDT) sensor.

The temperature sensor 104-2 is configured to sense the temperature of the oil in the reservoir 114 and supply a temperature signal representative thereof. As is generally known, various characteristics of oil vary with its temperature, and may impact the accuracy of the level measurement from the level sensor 104-1. Thus, the oil temperature that is sensed by the temperature sensor 104-2 is used to correct the oil level that is sensed by the level sensor 104-1. It will be appreciated that the temperature sensor may also be implemented using any one of numerous know temperature sensing devices now known or developed in the future. In a particular preferred embodiment, however, the temperature sensor 104-2 is implemented using a resistance temperature detector (RTD) such as, for example, a platinum RTD.

The attitude of the reservoir 114, which is typically a function of the attitude of the vehicle within which the system 100 is installed, may also impact the accuracy of the level measurement from the level sensor 104-1. As such, the attitude sensor 104-3 is provided and is configured to sense reservoir attitude and supply an attitude signal representative thereof. The attitude sensor 104-3 may be variously implemented using any one of numerous known or future developed attitude sensors. It will additionally be appreciated that the attitude sensor 104-3 may be a dedicated sensor or one that is used with another system. For example, in the context of an aircraft, the attitude sensor 104-3 may be one or more of the attitude sensors that form part of the normal aircraft avionics suite for the aircraft. In such instances, data from the attitude sensor 104-3 may be transmitted to the processor 106 via a non-illustrated aircraft data bus.

As FIG. 1 depicts, the system 100 may be implemented, if needed or desired, with more than the three sensors described above. For example, various environmental sensors may also be provided. No matter the additional type or number of sensors 104 that are provided, each preferably provides a signal that may be used by the processor 106 as a correction factor to increase the accuracy of the level that is sensed by the level sensor 104-1. It is additionally noted that the amount of air entrained in the oil can significantly impact the total oil volume, and thus a correction factor based on the amount of air in the oil is also provided. Various factors may impact the amount of air that becomes entrained in the oil system. These factors may include the amount of engine run-time, the amount of time since the engine was last operated, temperature, engine load, and oil type, just to name a few. The specific impact that these, and other variables, may have on the amount of air entrained in the oil are preferably determined experimentally.

The processor 106 is coupled to receive the sensor signals supplied from each of the sensors 104, and is in operable communication with memory 116. The memory 116 may be implemented using any one of numerous devices suitable for storing data. The memory 116 may be implemented using one or more of these suitable devices (only one depicted in FIG. 1), and may be disposed remote from the processor 106 or may be wholly or partially integral with the processor 106. As will be described in more detail further below, the memory 116 stores at least oil quantity data, data representative of the occurrence of a predetermined event, and engine operating time data.

In addition to receiving the sensor signals, the processor 106 also receives a command signal 118 and one or more engine state signals 122. The command signal 118 is used to initiate the process of determining the oil quantity in the gas turbine engine system 102 and the oil consumption rate of the gas turbine engine system 102. The one or more engine state signals 122 provide information regarding the general state of the gas turbine engine 108. More specifically, whether it is running, not running, if an engine start has been initiated, and/or time since the engine was last operated. It will be appreciated that the command signal 118 may be supplied from an external system or device, and may be supplied automatically from another, non-illustrated system, or from a non-illustrated user interface (e.g., button, knob, etc.) in response to input thereto from a user. The engine state signals 122 may be supplied from an external system or device (e.g., engine controller) or from the device within which the processor 106 is installed. For example, the processor 106 may, in some embodiments, be installed in an engine controller.

No matter the particular source of the command signal 118 and the engine state signals 122, the processor 106 is configured, upon receipt thereof, to selectively determine the oil quantity in the gas turbine engine system 102 (based on at least the level signal, the temperature signal, and the attitude signal) and the oil consumption rate of the gas turbine engine system 102. As FIG. 1 further depicts, the oil consumption rate may be supplied to one or more external devices and systems for implementing one or more functions. For example, the oil consumption rate may be used to provide various alerts, it may be used to indicate the need for maintenance, it may be used for prognostics, and/or it may be used for trend monitoring, just to name a few.

Figure 2:
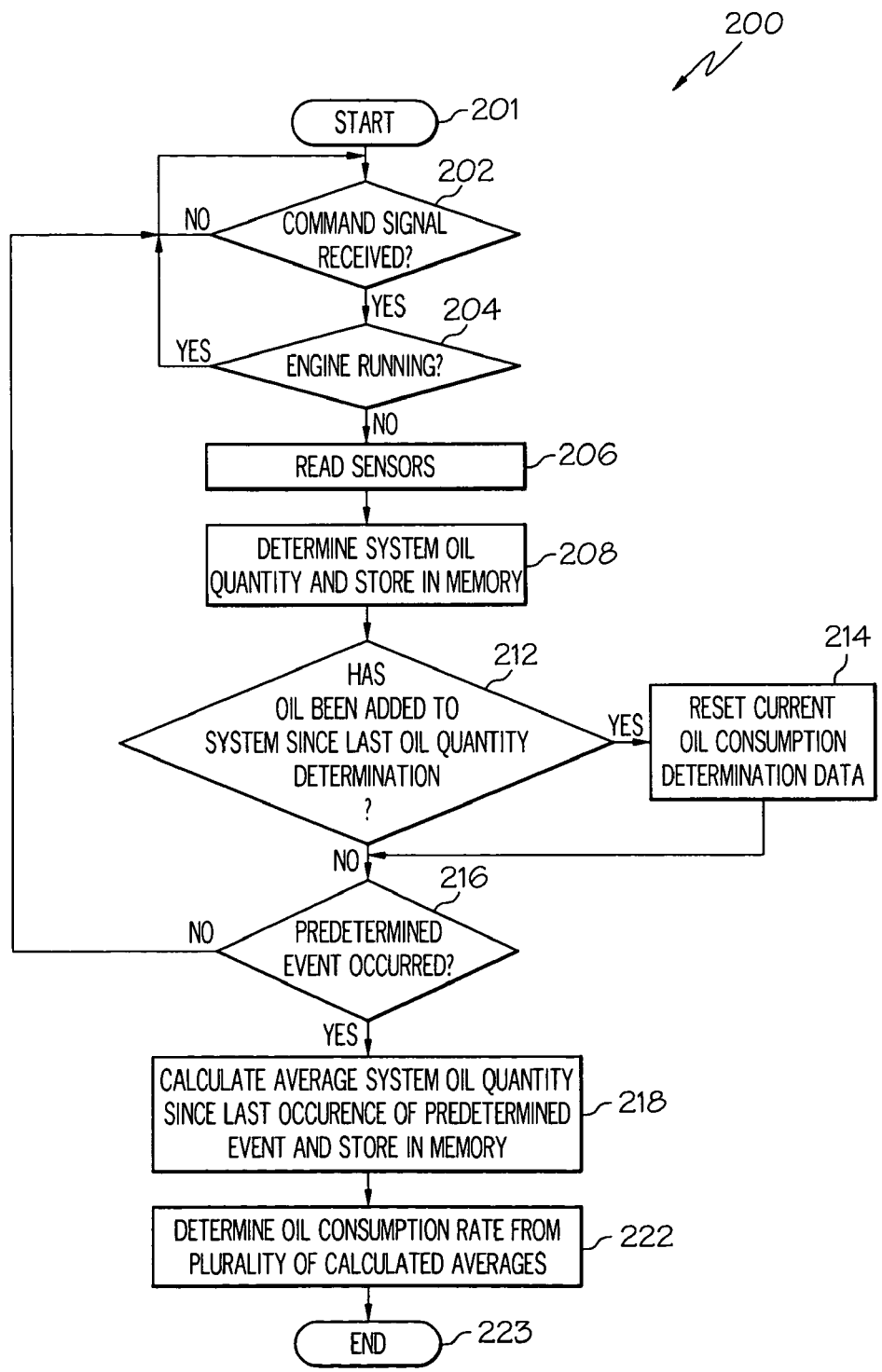
FIG. 2 depicts a process, in flowchart form, that may be carried out by the system of FIG. 1 to determine gas turbine engine system oil consumption rate.

The process carried out by the processor 106 in determining gas turbine engine system oil consumption rate is depicted in flowchart form in FIG. 2 and with reference thereto will now be described. In doing so it should be noted that the parenthetical references in the following description refer to like-numbered process blocks in the depicted flowchart. When the process 200 begins, the processor 106 determines whether it has received the command signal 118 (202). If not, the process 200 continually loops, awaiting receipt of the command signal 118. Upon receipt of the command signal 118, the processor 106 also determines, preferably from the one or more engine state signals 122, whether or not the gas turbine engine 108 is running (204). If the gas turbine engine 108 is running, the process 200 continually loops, once again awaiting the receipt of the command signal 118. If, however, the gas turbine engine 108 is not running, the processor 106 reads each of the sensors 104 (206), and then determines the oil quantity in the gas turbine engine system 102 and stores it in the memory 116 (208).

Before proceeding further, it is noted that the oil quantity in the gas turbine engine system 102 is determined from a multi-dimensional look-up table that may be stored in memory 116 or another suitable device. The look-up table includes a plurality of pre-stored data entries that correlate oil level in the reservoir 114 with the each of the sensed parameters. Preferably, the pre-stored data are determined during, for example, various pre-installation tests that may take place in a test cell or other suitably controllable environment. In any case, the processor 106, based on the signals supplied from the sensors 104, and appropriate interpolation of data if needed, determines the oil quantity in the reservoir 114. As may be appreciated, the data that are stored in the multi-dimensional look-up table may vary depending up the type of oil that is used in the particular gas turbine engine system 102. Thus, as FIG. 1 further depicts, the processor 106 may, at least in some embodiments, include an additional input signal 124 that is representative of the type of oil that is used in the monitored gas turbine engine system 102.

In addition to the above, it is noted that the oil quantity in the reservoir 114 may not accurately represent the total quantity of oil in the gas turbine engine system 102. This is because after the first time the gas turbine engine 108 has been started and appropriately lubricated some of the oil remains within the gas turbine engine 108 and does not drain back into the reservoir 114. The quantity of oil that remains in the gas turbine engine 108 after its initial start is a predetermined value that is established during testing and preferably stored in memory 116. Thus, after the initial start of the gas turbine engine 108 the total oil quantity in the gas turbine engine system 102 is equal to the oil quantity in the reservoir 114 plus the predetermined quantity that remains in the gas turbine engine 108.

After the total system oil quantity is determined and stored in memory 116, the processor 106 then determines whether oil has been added to the gas turbine engine system 102 since the last system oil quantity determination (212). The manner in which this determination is made may vary, but in one particular embodiment the processor 106 makes this determination by comparing the presently determined total system oil quantity to a calculated oil quantity value. This calculated oil quantity value is the sum of the previously determined total system oil quantity and the minimum oil fill quantity. If the presently determined total system oil quantity is greater than the calculated oil quantity value, then the determination is that oil has been added to the gas turbine engine system 102, otherwise the determination is that oil has not been added.

No matter the specific manner in which the determination is made regarding whether oil has been added to the gas turbine engine system 102 (212), it is seen that if it is determined that oil has been added, then the processor 106 resets the stored data that are being used for the current oil consumption rate determination (214). The reason for this will become apparent from the description of how the oil consumption rate is determined, which is provided further below. If, however, it is determined that oil has not been added, then the processor 106 determines whether the previously-mentioned predetermined event has occurred (216).

The specific predetermined event that is referred to herein may vary. For example, the predetermined event may be the occurrence of a predetermined number of gas turbine engine starts or it may be a specified amount of gas turbine engine operating time. In any case, if the processor 106 determines that the predetermined event has not occurred, the process 200 continually loops, once again awaiting the receipt of the command signal 118. Conversely, if the processor 106 determines that the predetermined event has occurred, it automatically calculates the average system oil quantity in the gas turbine engine system 102 since the last occurrence of the predetermined event and stores the average quantity value in memory 116 (218).

After the average system oil quantity has been calculated and stored (218), the processor 106 then determines the oil consumption rate of the gas turbine engine system 102 (222). The manner in which this determination may be made may vary, but in a particular preferred embodiment the oil consumption rate is determined from a plurality of the calculated and stored average oil quantities. Most preferably, the processor 106 determines the oil consumption rate using rolling blocks of average oil quantity calculation data and the engine operating times associated with these rolling blocks of data. A simplified representation of the use of rolling data blocks for the oil consumption rate determination is depicted in FIG. 3 and with reference thereto will now be described.

Figure 3:
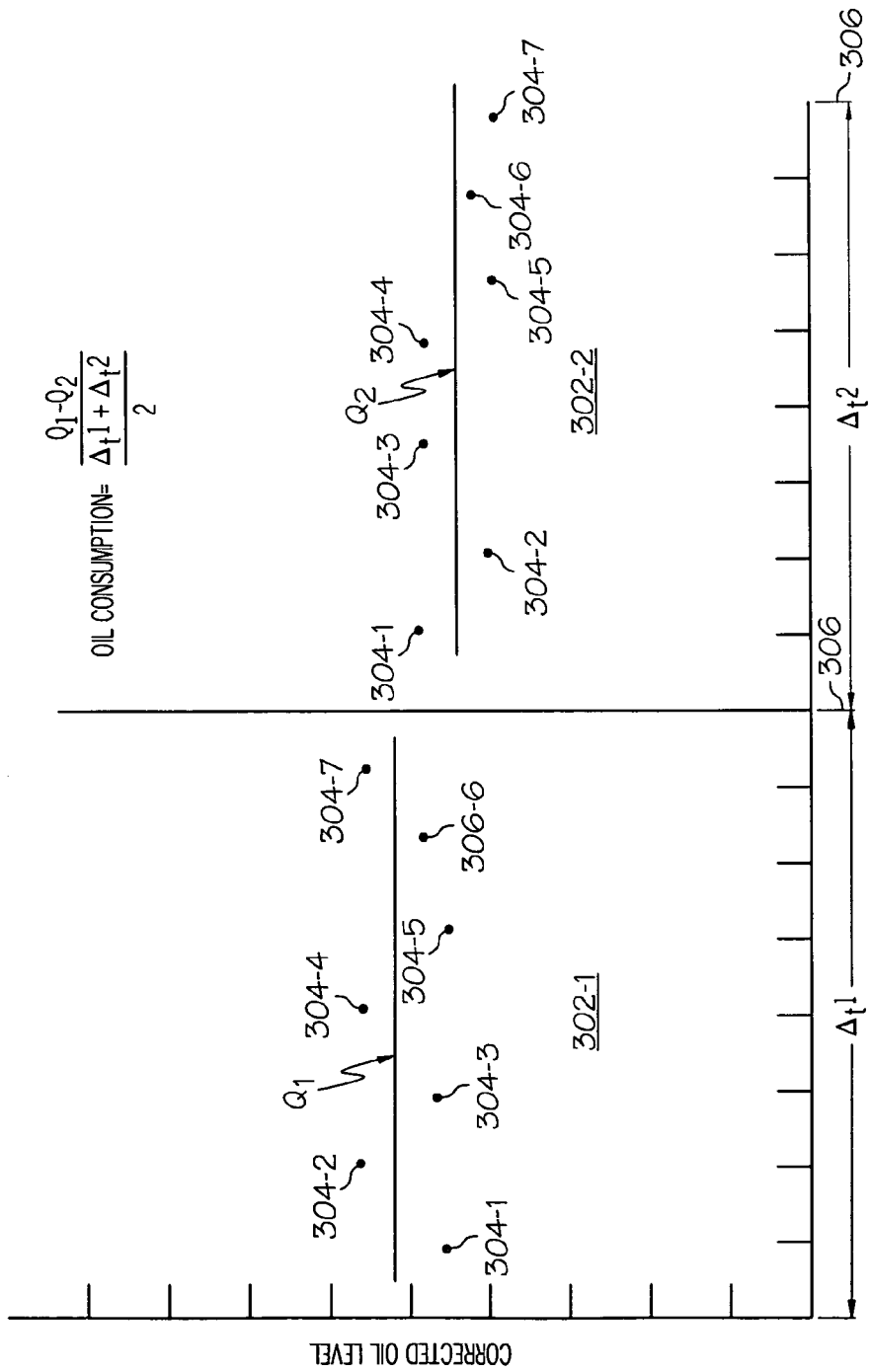
FIG. 3 depicts a simplified representation of rolling data blocks that are used to determine the oil consumption rate.

For ease of depiction and description, only two data blocks 302 (e.g., 302-1 and 302-2) are depicted in FIG. 3. It will nonetheless be appreciated that more than this number of data blocks 302 may be used to implement the consumption rate determination. The data blocks 302 include the total gas turbine engine system oil quantities 304 that were determined by the processor 106 between occurrences of the predetermined event 306. Again, for ease of depiction and description, each data block 302 includes seven oil quantity determination data points 304 (e.g., 304-1, 304-2, 304-3 . . . 304-7). It will be appreciated that this number may differ, and that each data block 302 would likely include more than this number of data points 304 (e.g., 304-1, 304-2, 304-3 . . . 304-N), though each could certainly include less. Moreover, depending upon the particular predetermined event, each data block 302 may not include the same number of data points 304. For example, if the predetermined event 306 is gas turbine engine operating time, then the number of pre-start oil quantity determinations may not be equivalent. Each time the predetermined event 306 occurs, the average system oil quantity ($Q_1$, $Q_2$) in the gas turbine engine system 102 is automatically calculated. When at least two data blocks 302 are available, the oil consumption rate may then be calculated from the average system oil quantities (Q1, Q2) and the associated engine run times using, for example, the formula depicted in FIG. 3.

Figure 4:
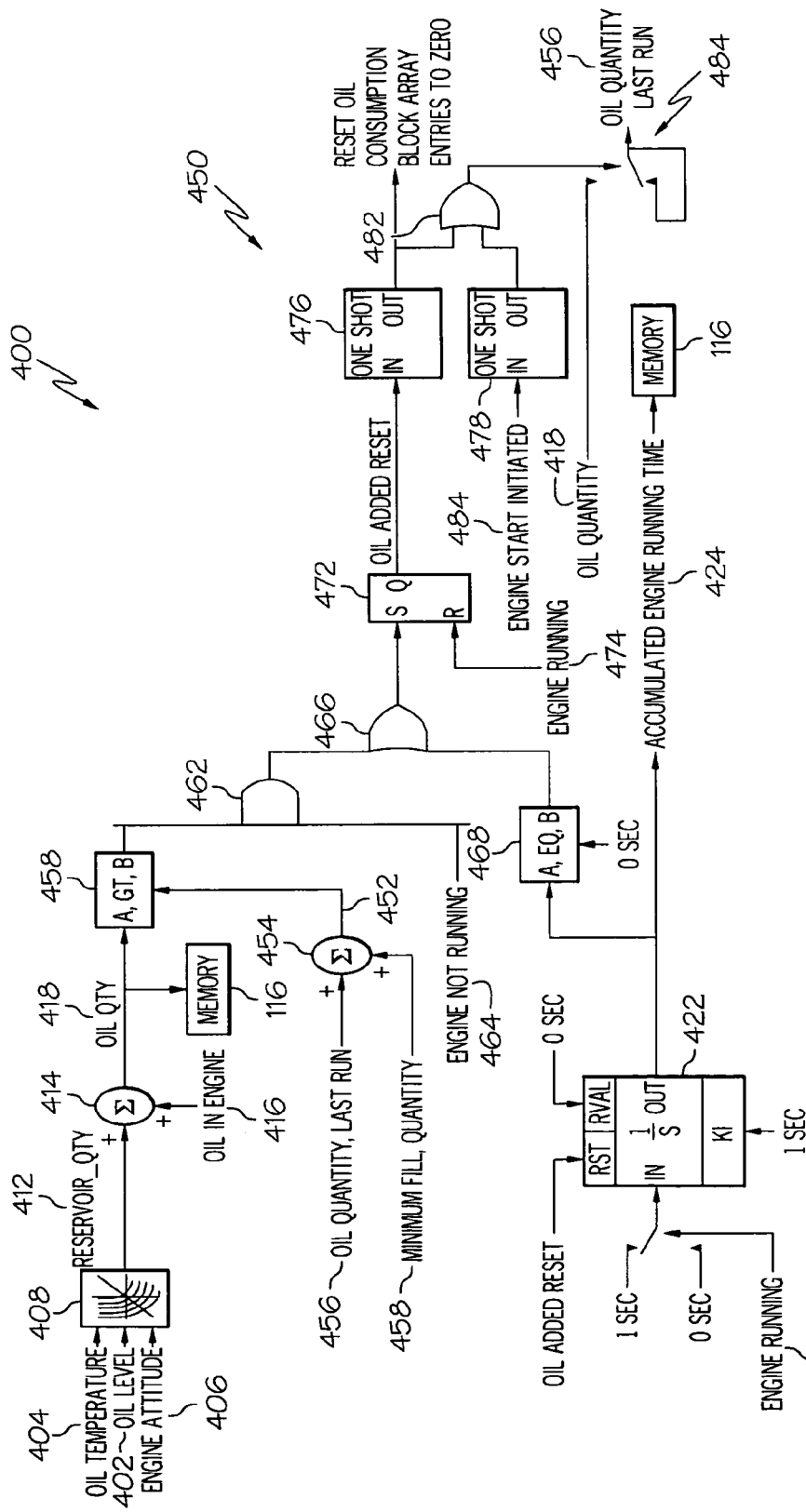
FIG. 4 depicts exemplary control logic that the exemplary system of FIG. 1 may implement to carry out the process of FIG. 2.

The manner in which the processor 106 carries out the above-described process 200 may vary. In one particular embodiment, the processor 106 carries out the process 200 by implementing the control logic that is depicted in FIG. 4, and that will now be more fully described. In doing so it will once again be emphasized that the logic symbols and functional blocks depicted in FIG. 4 are merely exemplary and may be realized in many different forms of hardware, firmware, and/or software components configured to perform the various functions.

Turning now to FIG. 4, the control logic 400 receives at least the level signal 402 from the level sensor 104-1, the temperature signal 404 from the temperature sensor 104-2, and the attitude signal 406 from the attitude sensor 104-4. Though not depicted in FIG. 4, and as was noted above, the control logic 400 may also receive additional signals from one or more additional sensors 104 (if included), the command signal 118, the one or more engine state signals 122, and the input signal 124 representative of oil type. Nonetheless, the signals from each of the sensors 104 are supplied to a multi-dimensional interpolation function 408. The multi-dimensional interpolation function 408, based on each of these inputs and the data stored in the above-mentioned multi-dimensional data table, supplies an output 412 (RESERVOIR_QTY) representative of the quantity of oil in the reservoir 114.

The output signal 412 from the interpolation function 408 is supplied to an addition function 414, which also receives a value 416 representative of a predetermined oil quantity (OIL_IN_ENGINE). As its nomenclature connotes, this predetermined oil quantity value 416, as was described above, is the quantity of oil that does not drain back into the reservoir 114 after the gas turbine engine 108 is shutdown, but rather remains within the gas turbine engine system 102. As may be appreciated, the output 418 (OIL_QUANTITY) from the addition function 414 is a value that is representative of the oil quantity in the entire gas turbine engine system 102. This oil quantity value 418, as previously noted, is stored in memory 116 and is subsequently used to determine the oil consumption rate.

The control logic 400 also includes an integrator function 422. The integrator function 422 is used to track the running time of the gas turbine engine 108 and supply an output 424 (ACCUMULATED_ENGINE_RUNNING_TIME) representative thereof. The engine running time, as was previously described, is also stored in memory 116 and is used to determine oil consumption rate. Moreover, it was noted that in some embodiments a predetermined amount of engine running time may be the predetermined event that triggers calculation of the average gas turbine engine system oil quantity. As FIG. 4 depicts, the engine running time that is tracked by the integrator function 422 may be selectively reset to zero. This occurs when the control logic 400 determines that oil has been added to the gas turbine engine system 102.

The portion of the control logic 400 that determines when oil has been added to the gas turbine engine system 102 may be referred to as RESET logic 450. This is because, in addition to resetting the engine running time to zero, it additionally functions to reset the oil quantities stored in memory 116 so that oil consumption rate may be more accurately determined. To implement this functionality, the RESET logic 450 compares the presently determined system oil quantity value 418 (OIL_QUANTITY), which is supplied from the addition function 414, to another oil quantity value 452 that is supplied from a second addition function 454. The second addition function 454 receives a value 456 equal to the previously determined total system oil quantity (OIL_QUANTITY_LAST_RUN) and a value 457 equal to the minimum oil fill quantity (MINIMUM_FILL_QUANTITY).

The values 418, 452 from each of the addition functions 414, 454 are supplied to a greater-than function 458. If the presently determined system oil quantity value 418 (OIL_QUANTITY) is greater than the oil quantity value 452, then oil has been added to the gas turbine engine system 102, and the output of the greater-than function 458 is a logic-HIGH (e.g., logical "1"). If, on the other hand, the presently determined system oil quantity value 418 (OIL_QUANTITY) is not greater than the oil quantity value 452, then oil has not been added to the gas turbine engine system 102, and the output of the greater-than function 458 is a logic-LOW (e.g., logical "0").

The output of the greater-than function 458 is supplied to an AND-logic function 462. The AND-logic function 462 also receives a logic input 464 representative of whether or not the gas turbine engine 108 is running (ENGINE_NOT_RUNNING). In accordance with the depicted embodiment, this input 464 is a logic-HIGH when the engine is not running, and is a logic-LOW when the engine is running. Thus, the AND-logic function 462 will supply a logic-HIGH if the output of the greater-than function 458 is a logic-HIGH (indicating that oil has been added to the gas turbine engine system 102) and the gas turbine engine 108 is not running. Otherwise, the output of the AND-logic function 462 is a logic-LOW.

The output of the AND-logic function 462 is supplied to an OR-logic function 466, which is also coupled to an output of an equal-to function 468. The equal-to function 468 compares the output 424 (ACCUMULATED_ENGINE_RUNNING_TIME) of the integrator function 422 to zero, and if the output is equal to zero then the output of the equal-to function 468 is a logic-HIGH. Otherwise, it is a logic-LOW. As is generally known, if either the output of the AND-logic function 462 or the output of the equal-to function 468 (or both) is (are) a logic-HIGH, then the output of the OR-logic function 466 is a logic-HIGH. Otherwise, it is a logic-LOW.

If the output of the AND-logic function 462 is a logic-HIGH, indicating that oil has been added to the gas turbine engine system 102, then the output of the OR-logic function 466, which is coupled to the SET (S) input of a S/R latch function 472, will concomitantly be a logic-HIGH. If the RESET (R) input of the S/R latch function 472 is a logic-LOW and its SET input transitions to a logic-HIGH, then its output (OIL_ADDED_RESET) will be a logic-HIGH, and will remain thus until the RESET input is a logic-HIGH. In the depicted embodiment, the RESET input is at a logic-HIGH when a logic value 474 (ENGINE_RUNNING) is at a logic-HIGH, which occurs when the gas turbine engine 108 is running. When the gas turbine engine 108 is not running, this logic value 474 is a logic-LOW.

The remainder of the RESET logic 450 includes two one-shot functions—a first one-shot function 476 and a second one-shot function 478—a second OR-logic function 482, and a HOLD function 484. The first one-shot function 476 is coupled to the output (OIL_ADDED_RESET) of the S/R latch function 472. As is generally known, the output (OUT) of a one-shot function is a logic-LOW unless its input (IN) is at a logic-HIGH, at which point the output will momentary transition to a logic-HIGH and then again back to a logic-LOW. Thus, the output of the first one-shot function 476 will momentarily transition to a logic-HIGH whenever the output (OIL_ADDED_RESET) of the S/R latch function 472 is a logic-HIGH. Though not depicted in FIG. 4, whenever the output of the first one-shot function 476 transitions to a logic-HIGH state, the oil quantities stored in memory 116 are reset.

The input (IN) of the second one-shot function 478 is coupled to receive a logic value 484 (ENGINE_START_INITIATED). This logic value 474 is at a logic-HIGH at the very initiation of the startup sequence of the gas turbine engine 108, before the gas turbine engine 108 actually begins turning. Thus, the output (OUT) of the second one-shot function 478 will momentarily transition to a logic-HIGH upon initiation of the startup sequence of the gas turbine engine 108.

The output of the second one-shot function 478 is coupled to one input of the second OR-logic function 482. A second input of the second OR-logic function 482 is coupled to the output of the first one-shot function 476. Thus, if either or both of the outputs of the first and second one-shot functions 476, 478 are a logic-HIGH, then the output of the second OR-logic function 482 is a logic-HIGH. Otherwise, it is a logic-LOW.

The output of the second OR-logic function 482 is coupled to, and controls, the HOLD function 484. When the output of the second OR-logic function 482 is a logic-LOW, the output (OIL_QUANTITY_LAST_RUN) of the HOLD function 484 remains unchanged. However, when the output of the second OR-logic function 482 is a logic-HIGH, the output (OIL_QUANTITY_LAST_RUN) of the HOLD function 484 is the presently determined system oil quantity value 418 (OIL_QUANTITY). The output (OIL_QUANTITY_LAST_RUN) of the HOLD function 484 is one of the values 456 supplied to the second addition function 454.

The system and method described herein provide for relatively high-accuracy monitoring and reporting of gas turbine engine system oil consumption.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of monitoring oil consumption in a gas turbine engine, comprising the steps of:
   sensing reservoir oil level when the gas turbine engine is not running;
   sensing reservoir oil temperature when the gas turbine engine is not running;
   sensing reservoir attitude when the gas turbine engine is not running;
   determining current gas turbine engine system oil quantity based on at least the sensed reservoir oil level, the sensed reservoir oil temperature, the sensed reservoir attitude, and a predetermined engine retention amount, the predetermined engine retention amount at least substantially equal to an amount of oil retained in the gas turbine engine after the gas turbine engine has been started at least once and when the gas turbine engine is not running;
   determining that a predetermined event has occurred;
   automatically calculating an average gas turbine engine system oil quantity after the predetermined event has occurred; and
   determining gas turbine engine system oil consumption rate from a plurality of calculated average oil quantities.

2. The method of claim 1, further comprising:
   measuring gas turbine engine running time;
   calculating the total gas turbine engine running time between each occurrence of the predetermined event; and
   determining gas turbine engine system oil consumption rate from the plurality of determined average oil quantities and a plurality of calculated total gas turbine engine running times.

3. The method of claim 1, further comprising:
   determining when oil has been added to the gas turbine engine system; and
   resetting at least a portion of the determined gas turbine engine system oil quantities to zero.

4. The method of claim 3, wherein the step of determining when oil has been added to the gas turbine engine system comprises:
   storing a previously determined gas turbine engine system oil quantity;
   adding a predetermined minimum fill quantity to the previously determined gas turbine engine system oil quantity to obtain a summed oil quantity;
   comparing the current gas turbine engine system oil quantity to the summed oil quantity; and
   determining that oil has been added to the gas turbine engine system if the current gas turbine engine system oil quantity is greater than the summed oil quantity.

5. The method of claim 1, further comprising:
   determining an amount of air in the oil; and
   determining the current gas turbine engine system oil quantity based additionally on the determined amount of air in the oil.

6. The method of claim 1, further comprising:
   determining the current gas turbine engine system oil quantity based additionally on oil type.

7. The method of claim 1, wherein the predetermined event is a predetermined number of gas turbine engine starts.

8. The method of claim 1, wherein the predetermined event is a predetermined amount of gas turbine engine running time.

9. A gas turbine engine oil consumption monitoring system, comprising:
   a level sensor configured to sense oil level in a reservoir and supply a level signal representative thereof;
   a temperature sensor configured to sense oil temperature in the reservoir and supply a temperature signal representative thereof;
   an attitude sensor configured to sense reservoir attitude and supply an attitude signal representative thereof; and
   a processor coupled to receive the level signal, the temperature signal, and the attitude signal, the processor adapted to receive a signal that indicates a gas turbine engine is not running and configured, upon receipt thereof, to selectively determine current gas turbine engine system oil quantity based on at least the level signal, the temperature signal, the attitude signal, and a predetermined engine retention amount that is at least substantially equal to an amount of oil retained in the gas turbine engine after the gas turbine engine has been started at least once and when the gas turbine engine is not running, the processor further configured to:
   determine that a predetermined event has occurred,
   automatically calculate an average gas turbine engine system oil quantity after the predetermined event has occurred, and
   determine gas turbine engine system oil consumption rate from a plurality of calculated average oil quantities.

10. The system of claim 9, wherein the processor is further configured to:
- track gas turbine engine running time;
- calculate a total gas turbine engine running time between each occurrence of the predetermined event; and
- determine the gas turbine engine system oil consumption rate from the plurality of determined average oil quantities and a plurality of calculated total gas turbine engine running times.

11. The system of claim 9, wherein the processor is further configured to:
- determine when oil has been added to the gas turbine engine system; and
- reset at least a portion of the determined gas turbine engine system oil quantities to zero.

12. The system of claim 11, wherein the processor is further configured to:
- store a previously determined gas turbine engine system oil quantity;
- add a predetermined minimum fill quantity to the previously determined gas turbine engine system oil quantity to obtain a summed oil quantity;
- compare the current gas turbine engine system oil quantity to the summed oil quantity; and
- determine that oil has been added to the gas turbine engine system if the current gas turbine engine system oil quantity is greater than the summed oil quantity.

13. The system of claim 9, wherein the processor is further configured to:
- calculate an amount of air in the oil; and
- determine the current gas turbine engine system oil quantity based additionally on the determined amount of air in the oil.

14. The system of claim 9, wherein the processor is further configured to:
- receive a signal representative of oil type used in the gas turbine engine system; and
- determine the current gas turbine engine system oil quantity based additionally on oil type.

15. The system of claim 9, wherein the predetermined event is a predetermined number of gas turbine engine starts.

16. The system of claim 9, wherein the predetermined event is a predetermined amount of gas turbine engine running time.

* * * * *